June 5, 1945.  A. VENDITTY  2,377,468
COUPLING
Filed July 27, 1942  3 Sheets-Sheet 1
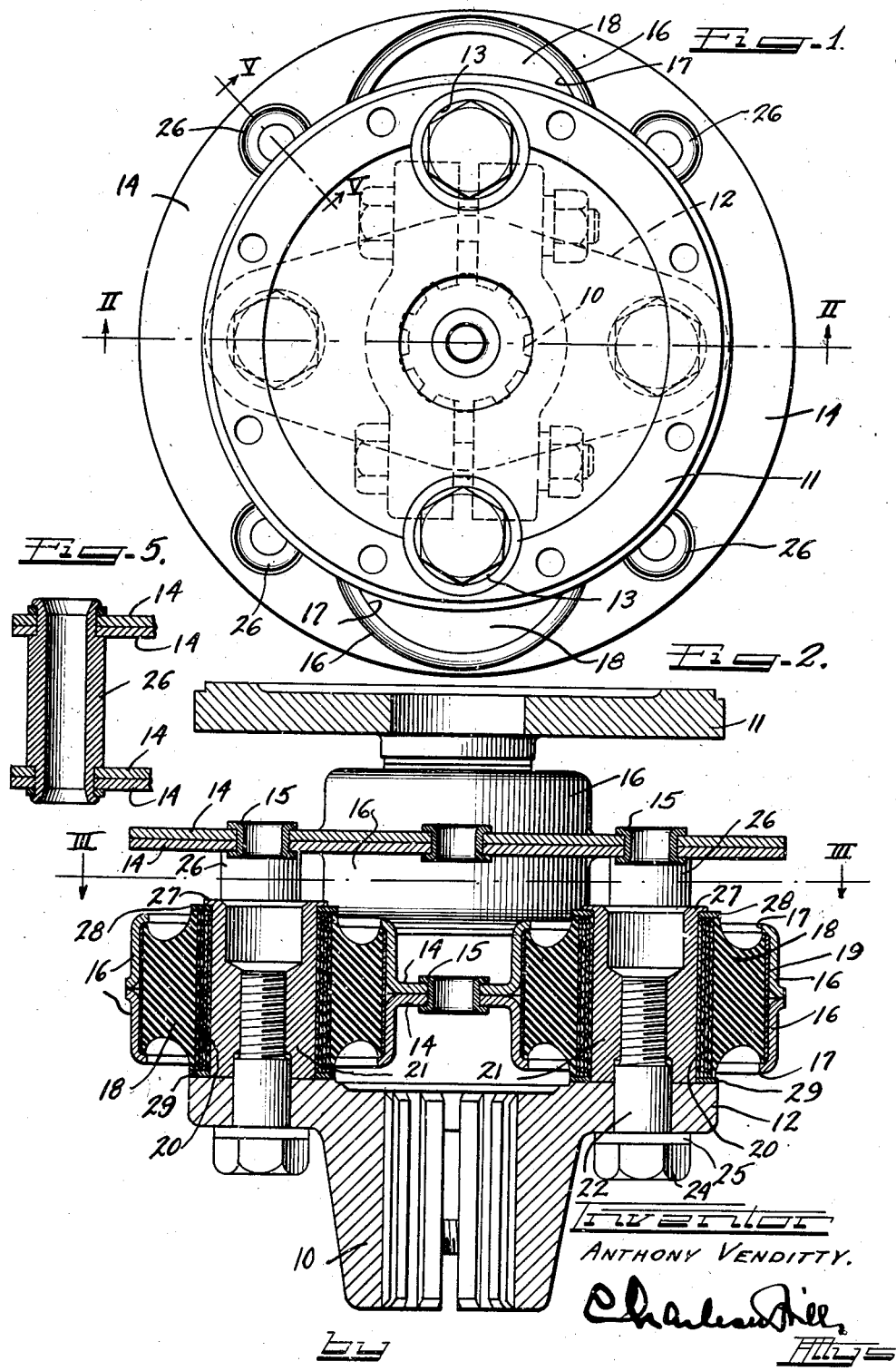
Inventor
ANTHONY VENDITTY.

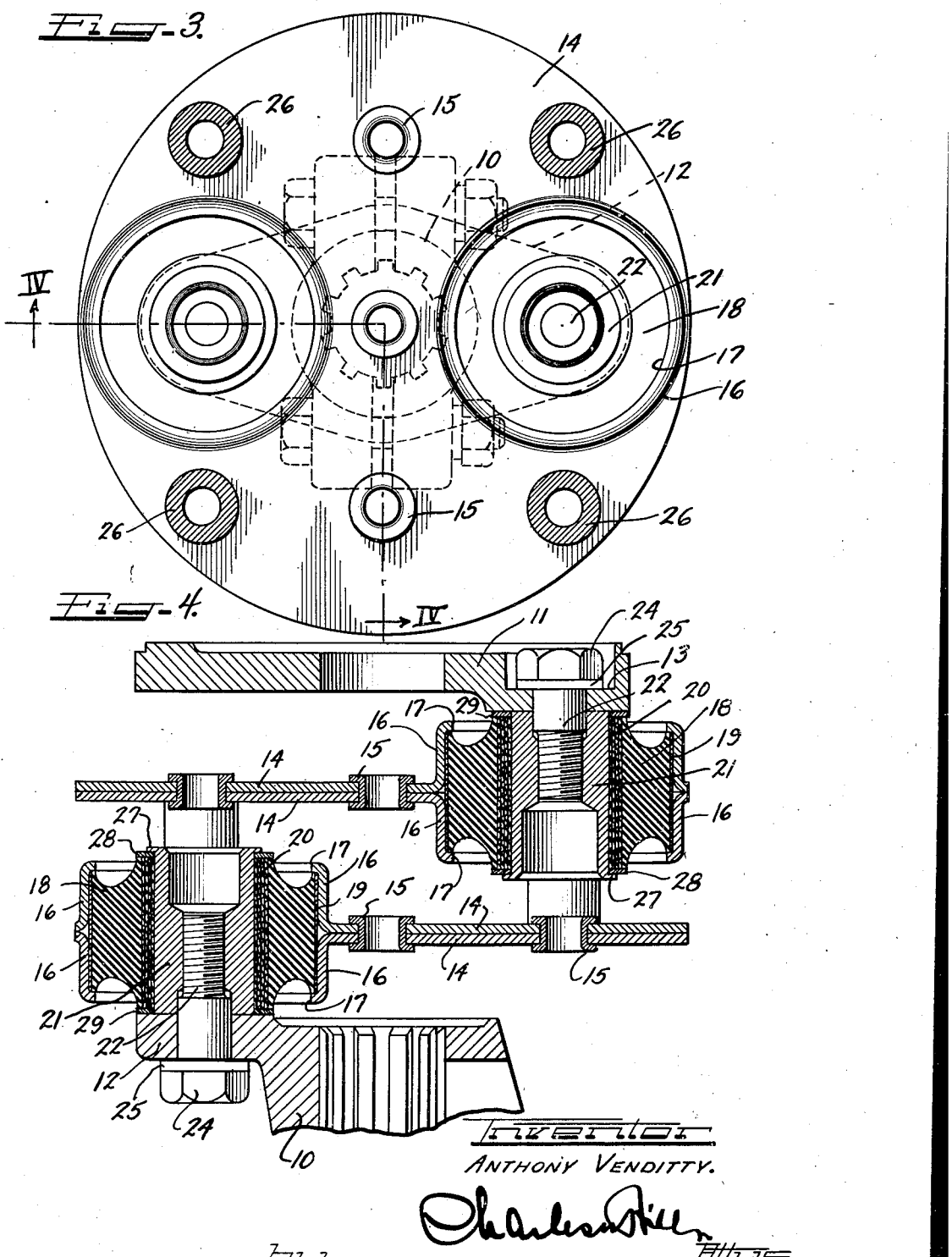

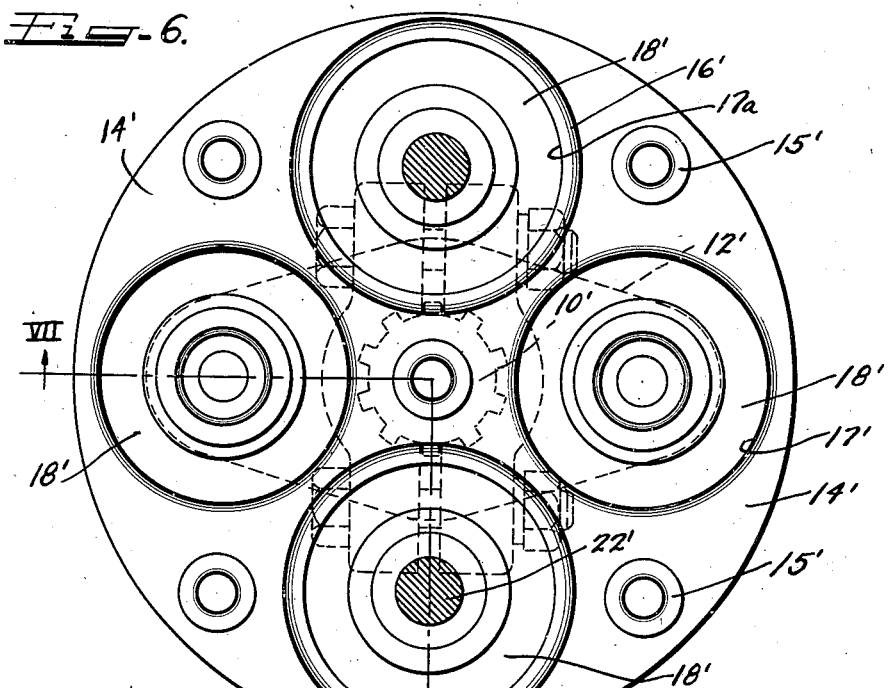
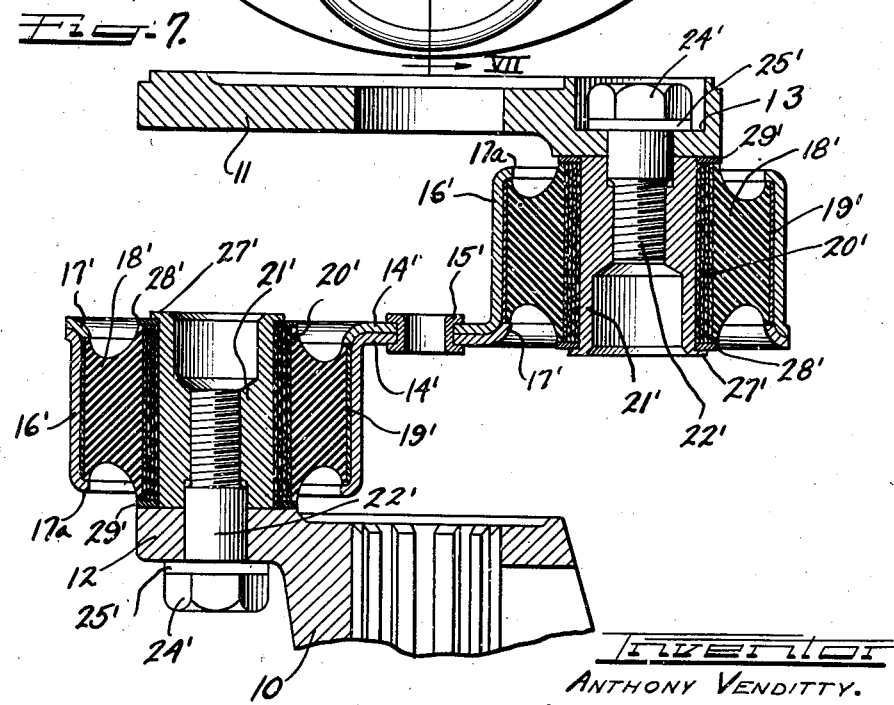

Patented June 5, 1945

2,377,468

UNITED STATES PATENT OFFICE 2,377,468

COUPLING

Anthony Venditty, Detroit, Mich., assignor to Thompson Products, Inc., a corporation of Ohio Application July 27, 1942, Serial No. 452,402

7 Claims. (Cl. 64—11)

This invention relates to joints and more particularly to a universal joint in which the parts thereof are so constructed and arranged that many of them are interchangeable.

An object of this invention is to provide a simplified and improved form of universal joint which lends itself to manufacture on a large production scale.

Another object of this invention is to provide a universal joint wherein the torque transmitting means embodies metallic stampings for defining rubber block housings in which the studs are trunnioned.

In accordance with the general features of this invention, there is provided in a joint or coupling including a plurality of opposed and spaced aligned coupling elements, torque transmitting means for interconnecting the elements comprising a pair of plates secured together and having depressed laterally therefrom aligned portions cooperating to define a rubber block receiving housing and a rubber block mounted and retained in the portions and provided with a central stud retained therein and connected to one of the coupling elements.

Also in accordance with one form of the invention including the usual spaced aligned coupling elements, there is provided a plurality of connected torque transmitting members for interconnecting the elements, each of these torque transmitting members comprising a pair of plates fastened together and having aligned sets of oppositely depressed portions, each set cooperating to define a housing for a rubber block mounted therein and in which rubber block there is retained a stud positioned for connection to one of the coupling elements. The studs of one member alternate with those of the other about the axis of the coupling and the studs of said one member being secured to one of the coupling elements whereas the studs of the other member are secured to the other coupling element.

In another form of the invention there is provided a joint including the usual aligned elements to be coupled together and having torque transmitting means for interconnecting these elements comprising a single pair of plates secured together and having depressed laterally therefrom a plurality of sets of aligned portions, each set cooperating to define a housing in which is retained a rubber block provided with a central stud held therein and connected to one of the coupling elements; the depressed portions of each set being concentric and annular and extending in the same direction from the plates proper.

Other objects and features of this invention will more fully appear from the following detailed description taken in connection with the accompanying drawings, which illustrate a single embodiment thereof, and in which:

Figure 1 is a plan view of a joint embodying the features of this invention;

Figure 2 is a cross-sectional view taken on a line II—II of Figure 1 looking in a direction indicated by the arrows;

Figure 3 is a plan view, partly in section, taken on a line III—III of Figure 2 looking downwardly and with the upper set of plates and rubber block assemblies removed;

Figure 4 is a sectional view taken on the irregular line IV—IV of Figure 3 looking in a direction indicated by the arrows;

Figure 5 is a detailed sectional view of one of the spacer elements taken on substantially the line V—V of Figure 1 looking in a direction indicated by the arrows;

Figure 6 is a plan view of a modified form of coupling or joint; and

Figure 7 is a sectional view taken on the irregular line VII—VII of Figure 6 looking in a direction indicated by the arrows.

As shown on the drawings:

The reference character 10 designates generally one coupling element which is spaced from but aligned with another coupling element 11. The coupling element 10 includes a flange 12 for connection to the intermediate torque transmitting means to be hereinafter described and embodying the features of this invention. It will be noted from the dotted lines in Figures 1 and 3 that the hub portion of the splined coupling element 10 is split and that the split sections are clamped together by suitable bolts and nuts shown in dotted lines. While I have illustrated a specific form of coupling element for connection to a stub shaft, it will be appreciated that the coupling element 10 can be of any suitable or desired construction without deviating from my invention, which relates primarily to the means employed for interconnecting the coupling elements 10 and 11.

The coupling element 11 is in the form of a plate and, as shown in Figure 4, is provided with shouldered and recessed portions 13 for accommodating the head ends of studs to be hereinafter described.

Positioned between the coupling elements 10 and 11 is my novel torque transmitting means, which comprises two sets of plates, each set being provided with a pair of spaced stud-receiving assemblies. Inasmuch as the plates and stud assemblies of each set are identical, it is believed that, for the sake of simplicity, a description of one set of plates and its rubber block assemblies will suffice for both. I have, however, used the same reference numerals to designate the corresponding parts in the two sets of plates, which plates are designated by the reference characters 14—14.

Each set of plates 14—14 are circular and are secured in contiguous relation by means of rivets 15 or other fastening means. The disk-like plates 14 comprise metal stampings and have depressed therefrom in opposite directions annular portions 16—16, each of which terminates in an annular lip 17 (Figure 4). These oppositely depressed portions 16—16 cooperate, when the plates 14—14 are secured together, to define a housing for receiving a rubber block 18. It will be noted that each set of plates has two of these rubber block assemblies, which are diametrically opposite from each other (Figures 1 and 3). The rubber block assemblies of one set of plates, however, are turned 90° relative to the rubber block assemblies of the other set of plates.

The outer periphery of each rubber block is bounded by a steel bushing or liner, which is held in place inside of the portions 16—16 by the turned lips 17—17. The inner periphery of the rubber block or ring 18 has embedded therein a wire mesh sleeve 20, which defines a central bore extending in the direction of the axis of the coupling and in which is fitted a metal stud-receiving sleeve 21.

Threaded into the metal sleeve 21 is a stud 22, which is in the form of a bolt and has an enlarged end extending through a hole in the enlarged shouldered portions 13 of the coupling element 11 (Figure 4). The bolt or stud, of course, has a head 24, which is tightened down against a washer 25 inside of the shouldered portion 13. It will, of course, be appreciated that, in the case of the coupling element 10, the stud extends through a hole in the flange 12, as shown in Figure 4, and has its head 24 bearing through a washer 25 tightly against a surface of the flange 12. The studs are identical in construction but cooperate in a slightly different manner with the portions of the two coupling elements 10 and 11, as is evidenced from Figure 4.

The two sets of spaced plates 14—14 and 14—14 are rigidly interconnected by means of a plurality of metal spacers 26 which I have illustrated in Figures 1 and 3 as being four in number. This metal spacing or bushing 26, as shown in Figure 5, has its ends suitably riveted or otherwise secured to the respective plates. Any suitable means may, of course, be used for fastening the plates in spaced relation although I have found the particular spacer construction 26, shown in Figure 5, to be satisfactory.

As noted before, the plates 14—14 are all interchangeable as is also true of the ring-like blocks of rubber and the component parts of the stud assemblies. This construction and arrangement of parts enables the simplified manufacture of my novel joint or coupling on a large scale production basis. It also permits of the manufacture of the principal parts of the torque transmitting means out of metal stampings.

The rubber rings may be made of any suitable type of rubber although I have found that good results are obtainable with vulcanized rubber. Also, inasmuch as the torque transmitted to the rubber is at right angles to the stud therein, the rubber is free to be displaced lengthwise of the stud or, in other words, out of the open ends of the portions 16—16 depressed from the metal plates 14—14.

Before concluding my description of the first form of the invention, it should be noted that the rubber block may be positively interlocked between a washer 28 held in place by a shouldered portion 27 on the end of the bearing 21 and a washer 29 disposed between the rubber block and the cooperating coupling member. The two washers 28 and 29 abut the ends of the wire mesh portion of the rubber block 18. This enables a tight gripping force to be applied to the reinforced part of the rubber ring or block 18.

In Figures 6 and 7 I have illustrated a modification of the invention wherein the coupling elements 10 and 11 are the same as the coupling elements of the first described form, and hence the same references have been used to designate the same parts in both forms. The principal difference between this form of the invention and the first described form resides in the torque transmitting means for interconnecting the coupling elements.

In this form of the invention, instead of employing two sets of plates, I employ only a single set of plates 14'—14' fastened together by rivets or other suitable fastening means 15'.

The single set of plates or disks 14'—14', which comprise metal stampings, has oppositely depressed sets of annular portions 16'—17' and 16'—17'. As shown in Figure 6, there are four sets of these depressed portions, which sets alternately face in opposite directions and accommodate and support annular rubber blocks 18'. Each rubber block 18' is retained in a set of depressed portions between the lip of portion 17' and a lip 17a formed on the extremity of the depressed portion 16'.

As in the case of the preferred form of the invention, the rubber block 18' is tightly fitted in a metal liner 19' and has its inner periphery provided with a wire mesh ring 20'. This wire mesh ring is embedded in the inner periphery of the rubber block so that it is a component of the rubber block. Fitted inside of the wire mesh inner surface of the rubber block 18' is a metal sleeve 21' having a central hole in which is threaded an end of a bolt-like stud 22', a head of which 24' cooperates through a washer 25' with one of the coupling elements in the same manner as in the previously described form of the invention.

The ends of the wire mesh inner portion of the rubber block 18' are confined between spaced washers 28' and 29'; the washer 28' being held in place by a shoulder 27' formed on the sleeve 21', as in the case of the preferred form of the invention.

The plates 14'—14' comprise interchangeable metal stampings, and the rubber block and stud assemblies are all identical with the exception that when they are assembled in place in the sets of plates 14'—14', alternate studs face in one direction for connection to one coupling element and the other studs face in the opposite direction for connection to the other coupling element.

It will be perceived that this form of the invention is somewhat simpler than the previously described one in that it dispenses with the necessity for an extra set of plates and also eliminates the necessity for any spacers, such as the spacers 26.

It will, of course, be understood that various details of construction may be varied through a wide range without departing from the principles of this invention and it is, therefore, not the purpose to limit the patent granted hereon otherwise than necessitated by the scope of the appended claims.

I claim as follows:

1. In a coupling including spaced aligned coupling elements, a plurality of torque transmitting members for interconnecting said elements each comprising a pair of plates fastened together and having aligned sets of oppositely depressed portions, each set cooperating to define a housing for a rubber block, a rubber block retained in each housing and a stud in each block and connected to a coupling element, the studs of one member alternating with those of the other about the axis of the coupling and being secured to one coupling element whereas the studs of the other member are secured to said other coupling element, and means connecting said torque transmitting members.

2. In a coupling including spaced aligned coupling elements, a plurality of torque transmitting members for interconnecting said elements each comprising a pair of plates fastened together and having aligned sets of oppositely depressed portions, each set cooperating to define a housing for a rubber block, a rubber block retained in each housing and a stud in each block and connected to a coupling element, the studs of one member alternating with those of the other about the axis of the coupling and being secured to one coupling element whereas the studs of the other member are secured to said other coupling element, and a connection between said torque transmitting members comprising a plurality of spacers arranged about but parallel to the axis of said coupling.

3. In a coupling including a plurality of opposed and spaced aligned elements, torque transmitting means for interconnecting said elements comprising a pair of plates secured together and having depressed laterally therefrom a plurality of sets of annular portions, alternate portions projecting in an opposite direction from that of the other set and each set comprising aligned concentric annular lips cooperating to define a rubber block receiving housing and a rubber block mounted and retained in said portions provided with a central stud, the studs of said sets of portions being alternately connected to the two coupling elements.

4. In a coupling, spaced opposed driving and driven members, plate-type torque transmitting means having two pairs of diametrically opposed bushing housings, the housings of one pair being disposed in the space between the driving member and a transverse plane midway between the driving and driven members, the housings of the other pair being disposed in the space between the driven member and said plane, resiliently bushed stud bearings in said housings, studs connecting the driving member with the stud bearings in said one pair of housings, and studs connecting the driven member with said stud bearings in said other pair of housings.

5. In a coupling, spaced opposed driving and driven members, torque transmitting means having one pair of diametrically opposed bushing housings disposed in the half of the space between the driving and driven members adjacent the driven member and a second pair of diametrically opposed bushing housings disposed in the other half of said space between the driving and driven members adjacent the driving member, rubber bushings in each of said housings, studs connecting the driven member with the bushings in said one pair of housings, and studs connecting the driving member with the bushings in said other pair of housings.

6. In a coupling, a driving member, a driven member in spaced opposed relation therefrom, a first pair of secured together plates in the space between the said members and adjacent said driving member, each plate of said first pair having aligned localized depressed portions forming bushing housings, bushings in said housings, a second pair of secured together plates in the space between said driving and driven members and adjacent the driven member, each plate of said second pair having localized depressed portions aligned to form bushing housings, bushings in said last-mentioned housings, studs on said driving member resiliently mounted in the housings of said first pair of plates, studs on the driven member resiliently mounted in the housings of said second pair of plates, and a plurality of spacers between said first and second pairs of plates rigidly connecting said pairs for co-rotation.

7. In a coupling, spaced opposed driving and driven members, a first torque transmitting plate in the space between said members having bushing housings adjacent the driving member, rubber blocks in said housings, studs on said driving member mounted in said rubber blocks, a second plate in the space between said members having bushing housings adjacent the driven member, rubber blocks in said bushing housing, studs mounted in said last-mentioned rubber blocks secured to said driven member, each bushing housing of each plate having an inturned lip at the end thereof adjacent the driving or driven member to prevent displacement of said rubber blocks toward said member, and each plate having a recess bounded by a flange extending into the housing of the other plate for retaining said rubber blocks against said inturned lips.

ANTHONY VENDITTY.